United States Patent [19]

Corey et al.

[11] Patent Number: 5,379,511
[45] Date of Patent: Jan. 10, 1995

[54] ARMATURE WINDING METHOD AND APPARATUS

[75] Inventors: Nathan A. Corey, Fairborn; Carl L. Clark, Dayton; Patrick A. Dolgas, Milford, all of Ohio

[73] Assignee: Globe Products, Inc., Huber Heights, Ohio

[21] Appl. No.: 32,359

[22] Filed: Mar. 16, 1993

[51] Int. Cl.6 .......................................... H01R 43/06
[52] U.S. Cl. ...................... 29/597; 29/564.6; 29/733
[58] Field of Search ............ 29/597, 598, 596, 733, 29/735, 564.6; 242/7.03, 7.05 B

[56] References Cited

U.S. PATENT DOCUMENTS

| | | |
|---|---|---|
| 3,628,229 | 12/1971 | Biddison et al. |
| 3,713,208 | 1/1973 | Doyle . |
| 3,713,209 | 1/1973 | Biddison . |
| 3,783,501 | 1/1974 | Biddison et al. |
| 3,785,034 | 1/1974 | Bucholtz . |
| 3,812,577 | 5/1974 | Compton et al. |
| 3,857,172 | 12/1974 | George et al. |
| 3,921,284 | 11/1975 | Bucholtz et al. |
| 3,927,456 | 12/1975 | Dammar . |
| 3,927,469 | 12/1975 | Dammar . |
| 3,927,843 | 12/1975 | Dammar . |
| 4,027,827 | 6/1977 | Biddison . |
| 4,633,577 | 1/1987 | Banner . |
| 4,827,601 | 5/1989 | Banner . |
| 5,187,856 | 2/1993 | Corey et al. |

FOREIGN PATENT DOCUMENTS 4-244 1/1992 Japan .
2013533 8/1979 United Kingdom .

OTHER PUBLICATIONS

The Globe Tech & Engineering Company Drawings, NCS H–65965, H–65984, H–65985, and H–65986.

Primary Examiner—Carl E. Hall
Attorney, Agent, or Firm—Roger S. Dybvig

[57] ABSTRACT

Pivotally mounted wire trimming blades having sharp, wire trimming, edges are positioned so that they extend through notches in the inner commutator shield of a double flier armature winder and lie against commutator start tangs and extend closely adjacent the outer periphery of the inner shield. The start or finish wires, as the case may be, are severed by being pulled against the wire trimming edges. The wire trimming edges have offset portions, or else the trimming blades are movable to offset locations, so that the trimming of the start wires are at locations which are radially and longitudinally offset from the locations at which the finish wires are trimmed.

13 Claims, 7 Drawing Sheets

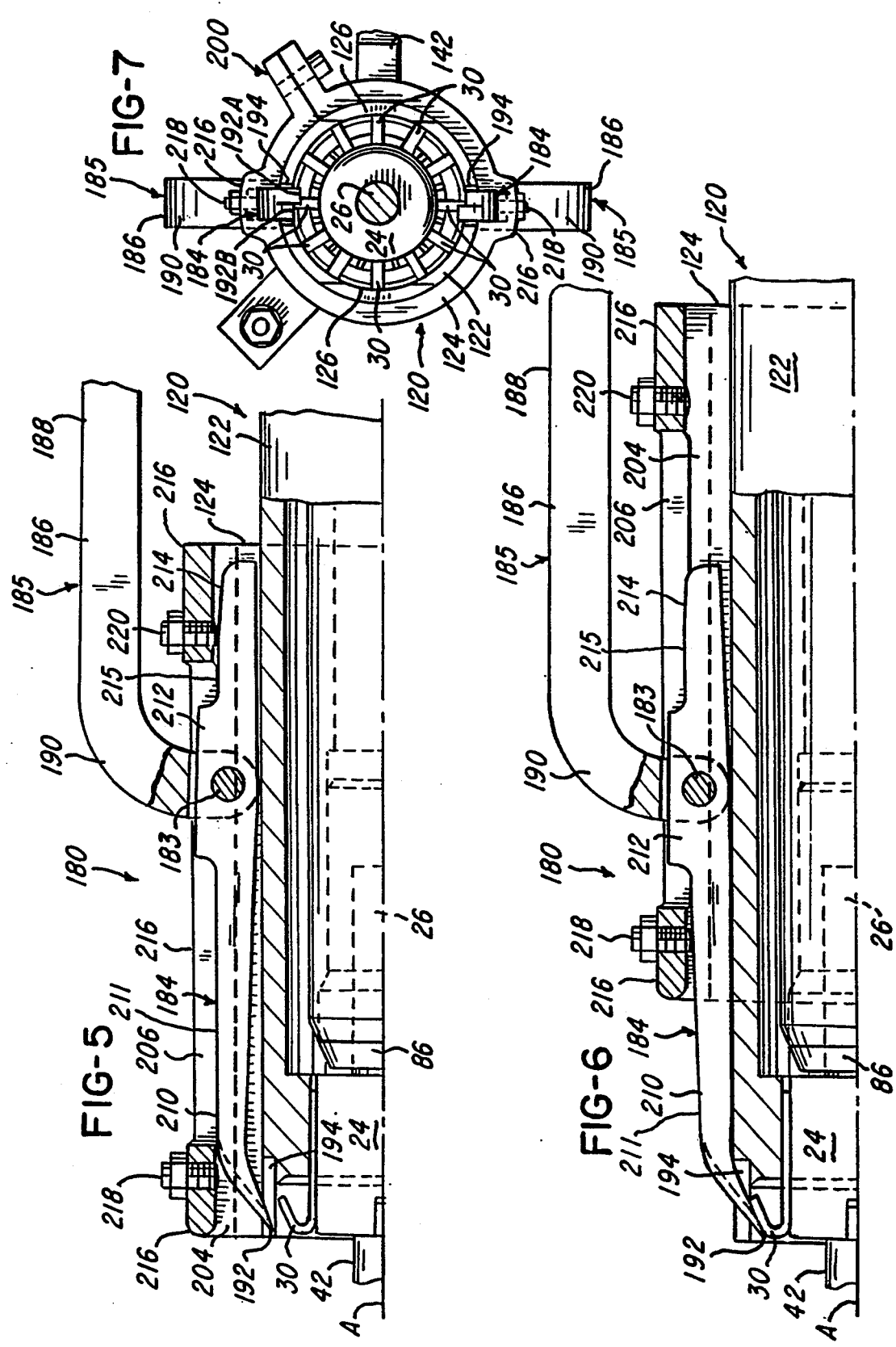

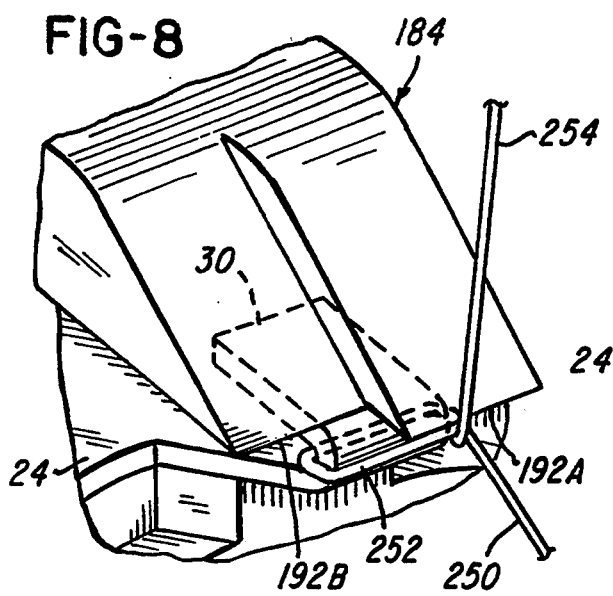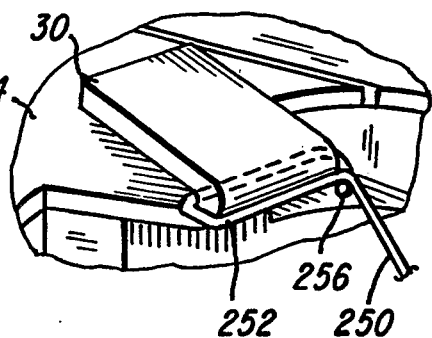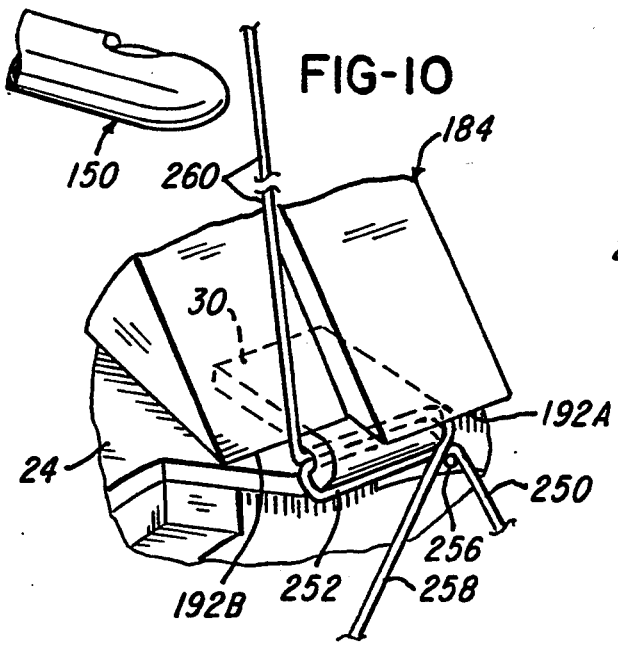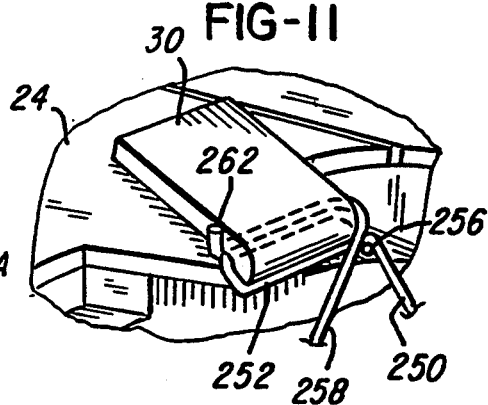

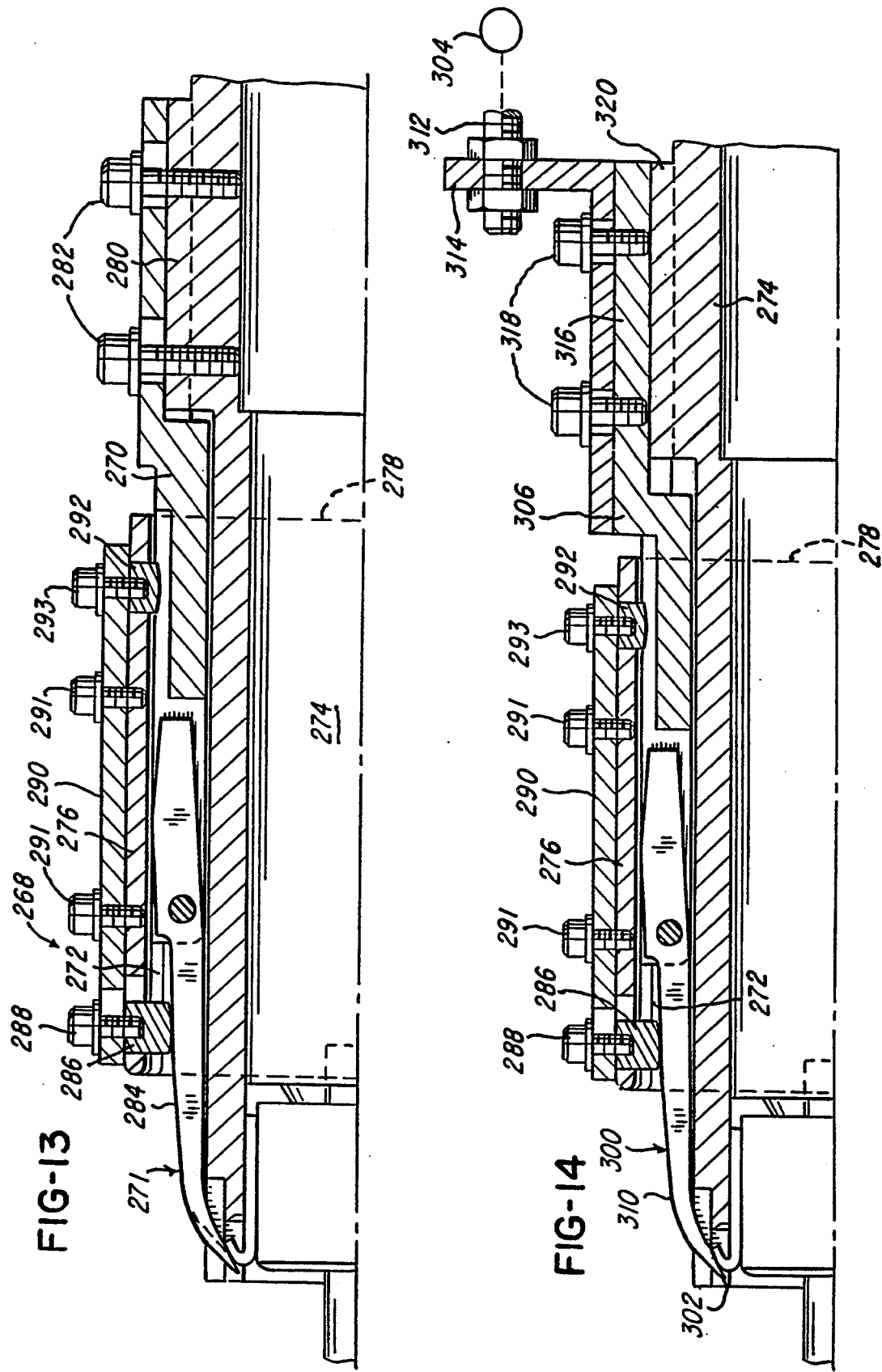

ARMATURE WINDING METHOD AND APPARATUS

Cross-reference to Related Application

This application is related to application Ser. No. 07/851,730, filed Mar. 17, 1992, now U.S. Pat. No. 5,187,856, granted Feb. 23, 1993.

SUMMARY OF THE INVENTION

This invention relates to an armature winding method and apparatus and especially to the severing of lead wires of armatures wound by an automatic double flier winding machine. As will become apparent, the invention is equally applicable to single flier winding machines.

The present invention is intended for use in the winding of armatures of the type having an armature core and a commutator mounted in spaced relation on an armature shaft and wherein the commutator is provided with coil lead-receiving hooks or tangs. As used herein, the term "start wires" refers to the wire segments (also called "coil leads") leading to the first coils wound by the fliers. The term "finish wires" refers to the wire segments or coil leads extending from the last coils wound. In double flier armature winding machines having two fliers, there are two start and two finish wires.

Flier-type armature winding machines commonly have a shield assembly including an inner shield and an outer shield. The inner shield is notched to expose a pair of commutator tangs to enable lead wires to be connected to them. When coils are being wound by the fliers, the outer shield covers the commutator tangs exposed through the inner shield notches to prevent the wire segments extending from the fliers from engaging the aforementioned commutator tangs. The outer shield is retracted from the path of the wire segments when the lead wire connections between the coil leads and the commutator tangs are to be made, as by reverse and forward movements of the fliers. Thus, coil lead connections to the tangs can be made by manipulation of the outer shield and the fliers.

In a typical process for winding an armature, the end of a wire segment extending from a flier is held by a wire gripper or clamp and the wire segment is looped around a commutator tang, after which the short strand of wire between the tang and the wire gripper is severed as close to the tang as possible. Coil lead connections between subsequently wound coils are made between the finish of the winding of one coil and the start of the winding of the next coil. A finish wire extending from the last coil to be wound by each flier is looped about the appropriate tang, the wire segment extending from that tang to the flier is clamped by the wire gripper or clamp, and the wire severed as closely as possible to the same tang. In a double flier armature winder, the foregoing process is carried out simultaneously by both fliers using duplicate sets of wire grippers and, in some cases, duplicate sets of wire cutters.

U.S. Pat. No. 3,812,577, granted to Jerry L. Compton and David R. Seitz on May 28, 1974, discloses an approach to the severing of the coil lead wires from an armature while it is located in a winding machine wherein either one or both of the start and finish wires are severed by relative movement of the wire clamps gripping the wires and the armature. As a result of such relative movement, the wires are stressed at the tangs and severed at or quite near the edges of the tangs. Accordingly, there is no excess wire left extending from the tangs and further trimming operations are unnecessary.

The approach disclosed in said Compton et al. '577 patent is frequently used, especially for relatively fine wire applications wherein there is a relatively high probability that the wire will break at the edge of the tang. There are circumstances in which start wires connected to tangs in accordance with the teachings of said Compton et al. '577 patent may be pulled off the tangs when the fliers commence rotation to wind the first coils. This problem may be cured in many cases by looping each start wire two times around its associated tang in the manner described in U.S. Pat. No. 3,713,208, granted to James N. Doyle on Jan. 30, 1973. However, it is not always desirable to employ the methods of said Doyle '308 patent due to the geometry of the commutator tangs. For example, a tang may be so configured that the additional start wire loop has an adverse effect upon the connection of the finish wire or upon the subsequent processing of the armature, such as the usual hot-staking of the tangs and the wire loops. Occasionally, wires severed from tangs in accordance with said Compton et al. '577 patent break at locations between the tangs and the wire clamps in which event the excess wire lengths must be manually trimmed. This can present a costly and difficult manufacturing problem when using modern high speed production equipment. In other cases, especially with relatively heavy wire, tangs may be bent when the clamps are moved to sever the wires.

A method and apparatus proposed to address the problems discussed above is disclosed in U.S. Pat. No. 4,633,577, issued to Alvin C. Banner on Jan. 6, 1987. With the mechanism shown in the Banner '577 patent, a pair of wire trimming members having sharp edges that may be located close to a pair of diametrically opposed tangs are provided, each of which is supported by an arm pivotally mounted on a part fixed in relation to the inner shield. A driving connection in the form of a pin and a cam slot is provided between each arm and the outer shield whereby each arm is caused to pivot in response to movements of the outer shield. Wire clamps that grip the wires are moved away from the trimming members whereupon the wires are pulled against and severed at the trimming edges because of the high stress concentration experienced by the wires at that point. The concept of breaking lead wires across the edges of trimming members is employed by the apparatus of this invention and the Banner U.S. Pat. No. 4,633,577 is hereby incorporated by reference herein.

The mechanism shown in the Banner '577 patent has not proved to be satisfactory because it is difficult to adjust and maintain in adjustment in addition to being relatively complex and space-consuming. Moreover, there is a tendency for the wires to be scraped or torn by the trimming edges rather to be cleanly broken.

An object of this invention is to provide an improved apparatus for severing armature coil lead wires. In accordance with this invention, a start wire or a finish wire can be reliably severed closely adjacent its associated commutator tang by positioning a wire trimming blade closely adjacent to the outer periphery of the inner shield and substantially parallel to the longitudinal axis of an armature in the winding station. The trimming blade is mounted on a mounting bracket for pivotal or rocking movement about a pivot axis extending transversely through the blade and intermediate its ends. At its forward end, the trimming blade has a sharp end edge, called a "trimming edge" herein.

When the outer shield is retracted to expose a pair of tangs, the trimming blade is pivoted, by engagement therewith of a cam bearing member on the outer shield, into a position in which its forward end extends through a blade-receiving notch in the forward end of the inner shield and its wire trimming edge is located in a wire-severing position at or closely adjacent to a commutator tang and closer to the armature shaft than the outermost surfaces of the tangs. This locates the trimming blade so that a start or finish wire can be pulled over a portion of a trimming edge and severed closely adjacent the tang about which the start or finish wire is looped or hooked. The actual severing of a wire lead is accomplished by pulling the wire segment leading to the wire clamp or gripper against the sharp trimming edge by moving the wire gripper away from the armature core. Preferably, the direction of movement of the wire gripper is substantially parallel to the longitudinal axis of the armature in the winding station so that a wire being severed is bent around the trimming edge and will break cleanly and reliably at the trimming edge when the wire gripper is moved away from the armature core.

The trimming blades in their wire-severing positions prevent the insertion or removal of an armature into or from the winding station. When the outer shield is in its extended position to prevent the wires used to form coils from accidentally hooking tangs exposed by the inner shield, the trimming blade is reversely pivoted so that its trimming edge is moved to an inactive position outside the circumference of the commutator tangs so that removal of the armature from the winding station is possible.

In the presently preferred embodiment, each trimming edge has two trimming edge portions, one for use in severing start wires and one for use in severing finish wires. The trimming edge portions are offset from one another radially, circumferentially, and longitudinally with respect to the shaft of an armature being wound as needed to optimize the trimming of both the start and the finish wires. There may also be small differences in the rotary orientation of an armature at the time during which the start wire is severed and the time during which the finish wire is severed to ensure that the coil wires to be severed will properly engage the trimming edges.

In another embodiment, the trimming blade is moved into different positions for the start wire trim and the finish wire trim to properly locate the trimming edge portions relative to the start and finish wire tangs.

Each trimming blade is desirably received in an elongate compartment formed between the outer surface of the inner shield and the inner surface of a hollow, U-shaped ridge formed along the wall of the outer shield and extending the length of the outer shield.

A blade support bracket pivotally supports each trimming blade within its blade-receiving compartment. Each blade support bracket is preferably clamped or fastened to the inner shield by means which enables adjustment of the longitudinal position of the blade pivot point and thereby the longitudinal position of the blade. The blade support member may extend over or, preferably, under the outer shield ridge, as will be further described below.

In a presently preferred embodiment, each trimming blade and its associated support bracket are confined against lateral movement by pairs of guide plates mounted on the inner shield.

Other objects and advantages of this invention will become apparent from the following description and the drawings.

BRIEF DESCRIPTION OF THE DRAWINGS

FIG. 1 shows parts of the machine and an armature after the looping of start wires about commutator tangs in preparation for the winding of coils on the armature and with the parts located in readiness to trim the wire segments leading from the commutator tangs to wire grippers.

FIG. 5 is a fragmentary side elevation view illustrating part of the portion of the machine illustrated in FIGS. 2, 3 and 4 but on a larger scale. The positions of parts in FIG. 5 correspond to the positions illustrated in FIG. 3 with the outer shield extended.

FIG. 6 is a fragmentary side elevation view similar to FIG. 5 but illustrating parts in the same position illustrated in FIGS. 2 and 4, with the outer shield retracted.

FIG. 7 is a front elevational view of a commutator and a portion of the machine of FIGS. 1 through 6, on a scale slightly larger than FIGS. 2 through 4, and showing, in cross section, the armature shaft on which the commutator is mounted.

FIG. 8 is an enlarged, fragmentary perspective view of a portion of a commutator including a coil lead-receiving tang portion thereof, a start wire looped around the tang, and a wire trimming blade in position for the severing of the wire strand between the tang and a wire clamp (not shown in FIG. 8).

FIG. 9 is a fragmentary perspective view of the commutator of FIG. 8 after the start wire has been severed adjacent the tang.

FIG. 10 is a fragmentary perspective view of portion of the commutator of FIGS. 8 and 9, including a coil lead-receiving tang, a start wire looped around the tang, a finish wire hooked to the tang, a wire trimming blade in position for the severing of the wire segment between the tang and a wire clamp, and a fragment of a wire clamp.

FIG. 11 is a fragmentary perspective view similar to FIG. 9 of the commutator of FIGS. 8, 9 and 10 after a finish wire has been severed adjacent a tang.

FIG. 13 is an enlarged, simplified, cross-sectional view of a portion of the machine of the embodiment illustrated in FIG. 12.

FIG. 14 is a view similar to FIG. 13 but showing a third embodiment.

DETAILED DESCRIPTION

Figure 1:
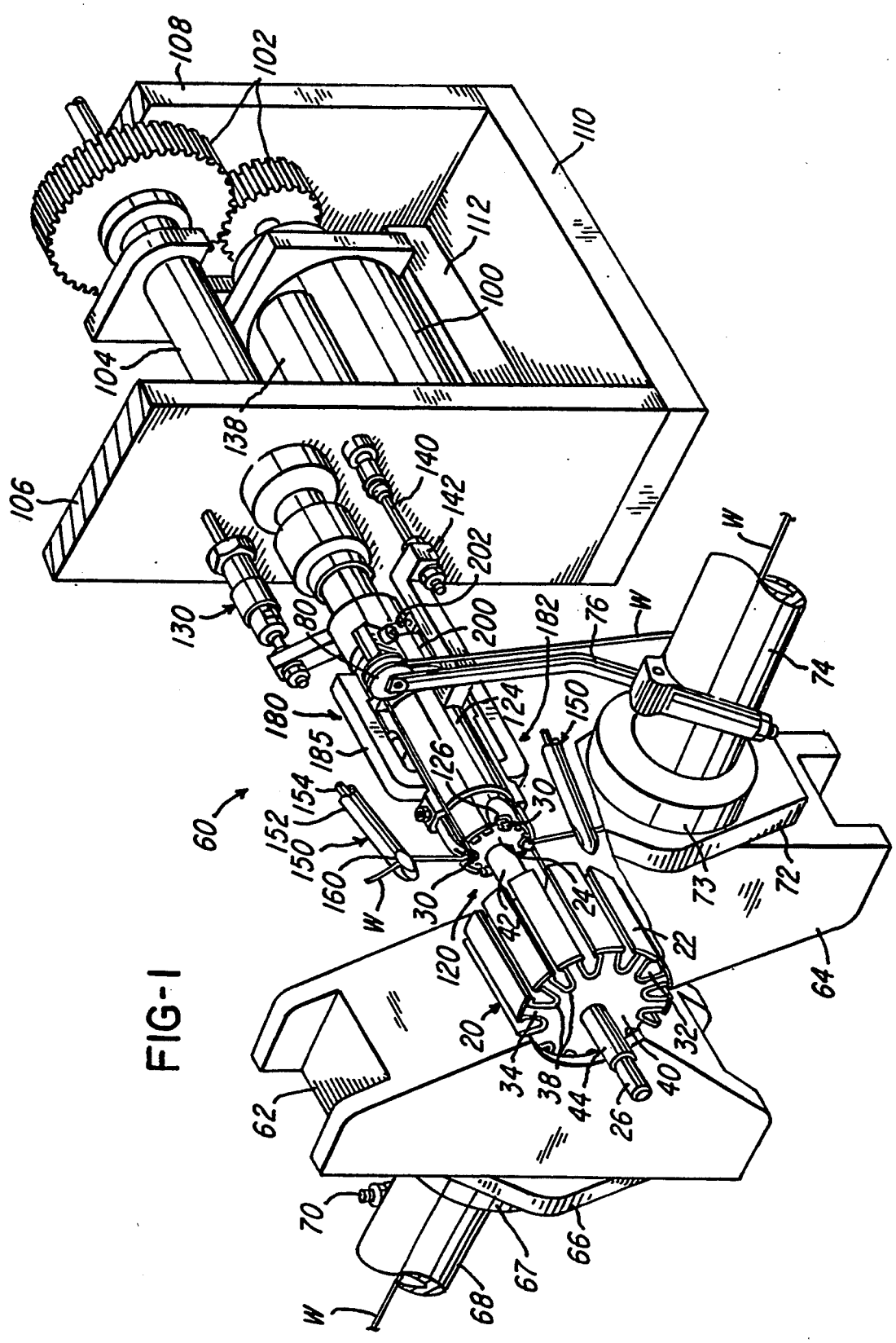
FIG. 1 is a fragmentary, partially diagrammatic and simplified perspective view, with parts broken away, of a portion of an armature winding machine in accordance with this invention.

With reference to FIG. 1, this invention is directed to an improved method and apparatus for winding the type of armature, generally designated 20, having a laminated core 22 and a commutator 24 mounted on an armature shaft 26. The commutator 24 has a plurality of circumferentially spaced commutator segments 28 (FIGS. 3 and 4) terminating in tangs 30 adjacent one end of the laminated core 22. The core 22 has a plurality of radially extending, outwardly opening, coil-receiving slots 32 separated by T-shaped teeth 34 which receive coil windings (not shown). As well known, the coil windings are wound from insulated wire and are completely isolated from the armature core 22 and the shaft 26 by plural insulating members including U-shaped slot liners 38, insulating core end pieces 40, an insulating sleeve 42 between the core 22 and the commutator 24, and an insulating sleeve 44 adjacent the opposite end of the core 22.

An armature winding machine in accordance with this invention is generally designated 60 and includes left and right side chucks or winding forms, designated 62 and 64 respectively, that receive the armature 20 between confronting, concavely curved surfaces thereof. The left side winding form 62 is mounted upon a mounting plate 66 mounted by a bearing (not shown) in a bearing housing 67 that rotatably receives a flier spindle 68 on which is affixed a left side flier 70 that is only partly visible in FIG. 1. The right side winding form 64 is similarly mounted upon a mounting plate 72 mounted by a bearing (not shown) in a bearing housing 73 that rotatably receives a flier spindle 74 for a right side flier 76.

As conventional, wire W is dereeled under tension from a supply spool (not shown) and coursed through the right side spindle 74 around a spindle exit pulley (not shown) mounted for rotation thereon and a flier pulley 80 mounted for rotation at the terminal end of the right side flier 76. Another strand of wire W is drawn under tension from another supply spool (not shown) through the left side spindle 68 and around a spindle exit pulley (not shown) and a left side flier pulley (not shown). As well known to those skilled in the art, the spindles 68 and 74 and, accordingly, the fliers 70 and 76, are simultaneously rotatably driven by a spindle drive motor or motors (not shown) for winding coils two at a time in spaced pairs of coil-receiving slots 32.

With reference to FIGS. 1 through 4, during the winding procedure, the end of the armature shaft 26 adjacent to the commutator 24 is gripped by a collet 86, the construction and operation of which may be entirely conventional and form no part of this invention. A description of the collet mechanism and its operation is contained in said Banner U.S. Pat. No. 4,633,577.

In preparation for winding the coils and during the winding cycle, the armature must be rotated as necessary to properly align its coil-receiving slots with the winding forms 62 and 64 and to enable appropriate connections to the commutator tangs to be made. Various forms of armature rotator devices may be used for this purpose and the details of the construction and operation thereof form no part of this invention. One such rotator device is shown for example in the U.S. Pat. No. 3,673,878 issued to John M. Biddison on Jul. 4, 1972. (The Biddison patent also discloses a collet assembly that could be used in lieu of that described in the Banner '577 patent.)

A preferred form of armature rotator device is shown in FIG. 1 and includes a stepping motor 100 which, through gears 102, drives a hollow rotator spindle 104 mounted for rotation within front and rear frame plates 106 and 108, respectively, of a rotator support frame including a base plate 110 and a frame brace plate 112. A more complete discussion of the rotator shown in FIG. 1 is contained in said Banner '577 patent.

The armature winding machine 60 further includes a commutator shield assembly generally designated 120 comprising an inner shield 122 and an outer shield 124. The inner shield 122 comprises a hollow, cylindrical body member that surrounds the commutator 24 and has a pair of opposed, tang-exposing notches 126 in its forward end, i.e., the end closest to the winding forms 62 and 64. The purpose of the inner shield notches 126 is to expose two diametrically opposed commutator tangs 30, such as the tangs 30 termed "start tangs" herein, located in position wherein the coil leads can be connected to them. In the machine 60, the start tangs are located in the generally horizontal plane, at positions which are referred to as the "3:00 o'clock" and the "9:00 o'clock" positions, when coil lead wire connections are to be made to the tangs. An inner shield support assembly 130 is affixed to the inner shield 122, as is conventional, to hold it in its proper position and orientation. Here it may be noted that the inner shield 122 of the machine 60 herein is non-rotatably mounted by its support assembly 130. This is in contrast to the rotatable inner shield employed in the machine shown in said Banner '577 patent.

Figure 2:
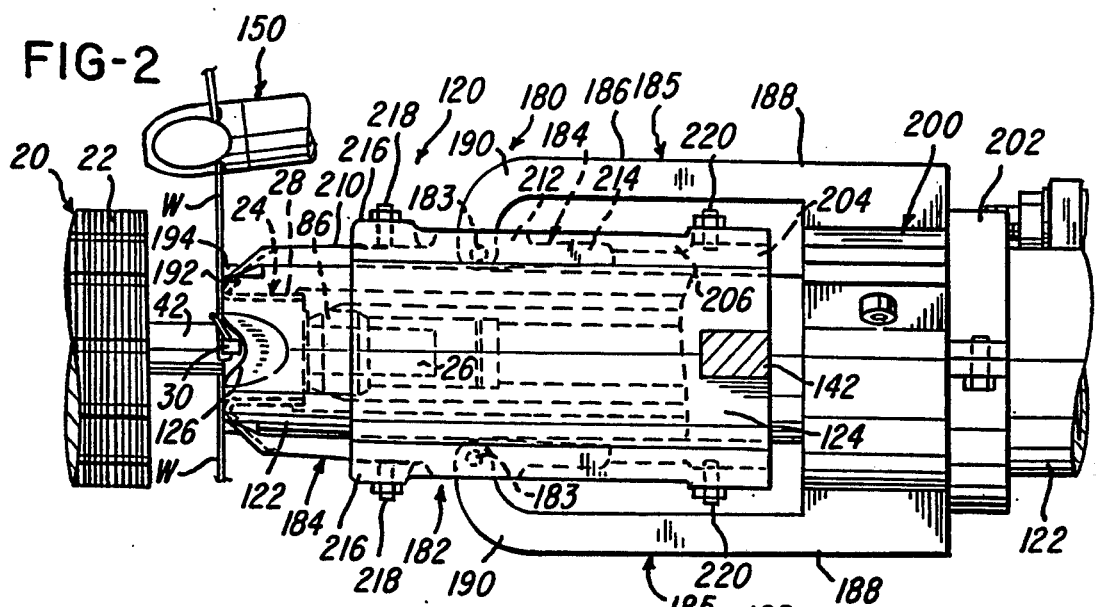
FIG. 2 is a fragmentary side elevational view of the machine of FIG. 1, with parts in cross section, and on a larger scale than FIG. 1, illustrating the parts after the start wires have been partially looped about selected commutator tangs but before the parts have been located as shown in FIG. 1. The outer shield is shown retracted in FIG. 2.

The outer shield 124 is advanced and retracted from a commutator tang-shielding position by an outer shield actuator 138 mounted on the front frame plate 106 and having a piston rod coupled to a drive link 140 connected to a bracket 142 that is connected to or integral with the outer shield 124. For reasons that will become apparent from the ensuing description, the outer shield actuator 138 is a compound cylinder capable of positioning the outer shield 124 selectively in one of two positions, namely, a fully extended position and a fully retracted position. Briefly, in its fully extended position, shown in FIGS. 3 and 5, the end of the outer shield 124 confronting the armature core 22 surrounds the corresponding end of the inner shield 122 and, accordingly, shields the commutator tangs 30 otherwise exposed by the inner shield notches 126 (FIGS. 1 and 2). In its fully retracted position, shown in FIGS. 2, 4 and 6, the inner end of the outer shield is located in a maximally spaced location from the armature core 22 and exposes a substantial length of the inner shield 122, including the inner shield notches 126 and therefore also exposes the commutator tangs 30 aligned with the notches 126. (Here it may be noted that the positions of members 130 and 140 are shown in the drawings in positions that are essentially reversed from the positions they occupy in armature winders that are known in the art. This is done for purposes of clearly illustrating the outer shield movements in FIGS. 2, 3 and 4.)

The armature winding machine 60 of this invention is provided with a pair of wire clamps or grippers 150 for gripping the wire segments leading to the fliers at the beginning and the end of the winding of each armature. Each wire gripper 150 may comprise a relatively fixed clamp jaw 152 and a relatively movable clamp jaw 154. The fixed clamp jaw 152 is affixed to one piston of an air-powered, compound, clamp operating actuator (not shown) and the movable jaw 154 is affixed to the other piston (not shown) of a clamp operating actuator (not shown). In operation, to clamp the wire at the end of the winding of an armature, the relatively fixed jaw 152 of the upper gripper 150 is first moved adjacent the wire segment extending from the tang 30 at the "3:00 o'clock" position to the flier pulley 80 after the armature has been rotated to move the tang 30 from the 3:00 o'clock position to the 12:00 o'clock position. The relatively movable jaw 154 is then moved adjacent the wire. The forward end of the relatively fixed jaw 152 has flanges 160 over which the wire is cammed as it moves adjacent the wire. The front, or leading end of the relatively movable jaw 154 is beveled to come into clamping engagement with the part of the wire adjacent the flanges 160.

In accordance with this invention, the start and finish wires are trimmed or severed closely adjacent to their associated tangs 30 with the assistance of an upper wire trimming assembly, generally designated 180, and a lower wire trimming assembly, generally designated 182. Depending upon the direction which the armature is rotatably indexed, the upper wire assembly is used with the left side flier 70 or else the right side flier 76. For purposes of this description, it is assumed that the upper wire trimming assembly 180 is used with the right side flier 76, and is discussed in detail herein. It will be observed in FIGS. 2, 3 and 4 that the lower wire trimming assembly 182 is constructed essentially identically to the upper wire trimming assembly 180. Like parts of the lower assembly 180 and 182 are identified by the same reference numbers, the only difference being that the lower wire trimming assembly 182 is located at the 6:00 o'clock position instead of the 12:00 o'clock position. It is expected that the two wire trimming assemblies 180 and 182 will always be located 180 degrees apart but it will be recognized that they could be located at positions other than 6:00 o'clock and 12:00 o'clock depending upon the geometry of the winding machine.

The upper wire trimming assembly 180 comprises an elongate wire trimming blade 184 and a mounting bracket 185 comprising an elongate arm 186 that extends parallel to the longitudinal axis "A" of the shield assembly 120 and radially outwardly from the 12:00 o'clock position thereof. Bracket arm 186 has a fixed end 188 clamped to the inner shield 120 and a free end 190 terminating in a downwardly depending clevis upon which the trimming blade 184 is pivotally mounted in a position wherein the wire trimming blade 184 is closely adjacent and parallel to the outer periphery of the inner shield 122 at the 12:00 o'clock position thereof and extends substantially parallel to the longitudinal axis "A" of the shield assembly 120.

The pivot axis 183 of the wire trimming blade 184 extends transversely through the wire trimming blade 184 intermediate its ends and lies in a vertical plane which is perpendicular to the longitudinal axis of the shield assembly 120. The front end of the wire trimming blade 184 slopes downwardly and forwardly to a transversely extending, sharpened trimming edge 192 at the leading end of the blade 184. As can be seen from a comparison of FIGS. 3 and 4 and also a comparison of FIGS. 5 and 6, the wire trimming blade 184 is spaced sufficiently from the inner shield 122 and its pivot axis 183 is so located that the blade 184 may be pivoted or rocked about its pivot axis 183 into two different end positions. In one end position, shown in FIGS. 3 and 5, the forward end of the blade 184 is spaced sufficiently from the longitudinal axis A of the shield assembly 120 that an armature 20 may be inserted into or removed from the shield assembly 120 without interference from the blade 184. In the other end position, shown in FIGS. 2, 4 and 6, the forward end of the blade 184 lies along and closely adjacent the forward face of the commutator tang 30 located at the 12:00 o'clock position, with the wire trimming edge 192 located between that tang 30 and the armature core 22, closer to the longitudinal axis A of the shield assembly 120 than the outermost parts of the tangs 30. In the latter position, the blade 184 would prevent loading or unloading of an armature 20 and is positioned to sever a wire lead held by the clamp 150 as will be described below. In order to enable the upper and lower wire trimming edges 192 to be placed as close to the tangs 30 as possible, the forward end of the inner shield 122 has notches 194 at the 6:00 o'clock and the 12:00 o'clock positions into which the leading ends of the blades 184 can extend so that they can lie over the tangs 30 in abutting or nearly abutting relation thereto.

Both the upper and the lower bracket arms 186 are connected to a mounting ring 200 clamped to the rearward end of the inner shield 122. By loosening the clamping pressure exerted on the mounting ring 200, it may be moved longitudinally of the inner shield 122 to thereby enable adjustment of the wire trimming blades 184 along the longitudinal axis A of the shield assembly 120. After a proper adjustment is obtained, an abutment ring 202 is preferably clamped to the inner shield 122 in abutting relation to the rear face of the mounting ring 200. With this arrangement, one may remove the upper and lower wire trimming assemblies 180 and 182 as a unit for repair or replacement and quickly reassemble the parts in the desired position of adjustment along the length of the inner shield 122 simply by clamping the mounting ring 200 to the outer shield 122 with the mounting ring 200 engaged with the abutment ring 202.

Outer shields 124 are normally cylindrical and closely surround their associated inner shields 122. The same is true for the outer shield 124 of this invention except that it is shaped at its 6 o'clock and 12:00 o'clock positions with radially outwardly-projecting and longitudinally-extending, hollow, U-shaped, ridges 204 that provide, with the confronting parts of the inner shield 122, elongate, blade-receiving compartments in which the wire trimming blades 184 are located. The radially outermost walls 216 of the ridges 204 are provided with elongate slots 206 that receive the leading ends of the bracket arms 186. The bracket arm-receiving slots 206 are sufficiently long that the bracket arms 186 do not interfere with the axial movements of the outer shield 122 needed to cover and uncover the forward end of the inner shield during winding, lead connecting, and lead trimming operations.

In order to provide for the pivoting or rocking of the upper wire trimming blade 184 about its pivot axis A, the blade 184 is formed in three sections, namely, a forward end section 210 having a camming surface, designated 211 (FIGS. 5 and 6), that slopes upwardly from front to rear, an intermediate section 212, and a rearward end section 214 having a camming surface, designated 215, that slopes downwardly from the intermediate section 212 to the rear end of the blade 184. The intermediate section 212 is the thickest part of the blade 184 and is so made to provide for the blade pivot pin 183 to extend therethrough.

To pivot the blades 184 as appropriate to reorient them from one end position to the other, the outer walls 216 of the outer shield ridges 204 are each provided with two inwardly-extending set screws, namely a front set screw 218 and a rear set screw 220. The radially innermost end surfaces of the set screws 218 and 220 constitute cam bearing members adapted to engage, respectively, the outer sloping surfaces of the front and rear sections of the blades 184, causing them to pivot or rock about their respective axes whenever the outer shield 124 undergoes a longitudinal movement. With this construction, it will be noted that the blades 184 are pivoted so that their wire trimming edges 192 are closely adjacent the tangs 30 at 6:00 o'clock and 12:00 o'clock and radially nearer the armature shaft 26 than the outer edges of the tangs 30 when the outer shield 124 is retracted and located sufficiently remote from the tangs 30 when the outer shield 124 is extended that the blades 184 would not then interfere with the loading and unloading of armatures 20.

The operation of the apparatus of this invention will be apparent from the foregoing description and the drawings. Briefly, FIG. 2 shows a step in the operation of the winding machine 60 shortly after an unwound armature 20 has been inserted into the collet 86. With the wires W leading from the fliers 70 and 76 held by the wire grippers 150 as shown in FIG. 1, the outer shield 124 has been retracted to expose the inner shield notches 126 to enable a wire loop to be formed around the start tangs 30 at the 3:00 o'clock and the 9:00 o'clock positions by movements of the fliers 70 and 76, in a well-known manner. The outer shield 124 is then extended into the position illustrated in FIG. 3 and the fliers 70 and 76 rotated to complete loops of wire around the start tangs 30. The armature 20 is then rotated through 90 degrees to bring the start tang 30 about which the loop is formed at the 3:00 o'clock position up to the 12:00 o'clock position and the other start tang 30 about which a loop is formed at the 9:00 o'clock position to the 6:00 o'clock position. The wire grippers 150 are simultaneously or immediately thereafter pivoted to remove slack in the wires caused by the rotation of the armature 20. The foregoing steps produce the position of parts shown in FIG. 3.

Figure 3:
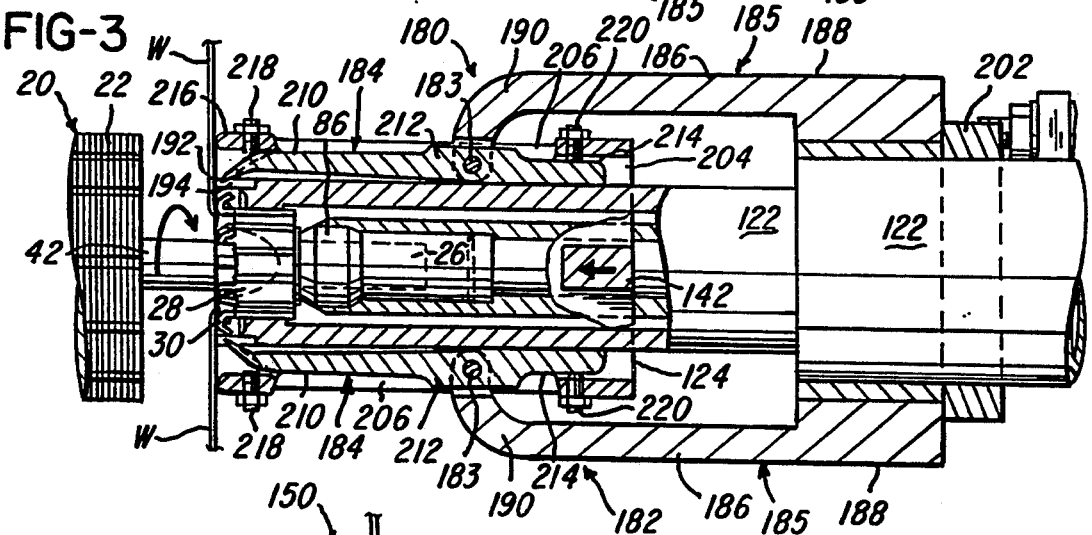
FIG. 3 is a fragmentary side elevational view, with parts in cross section, similar to FIG. 2, illustrating the rotation of the armature core to its position shown in FIG. 1 and with the outer shield extended.
Figure 4:
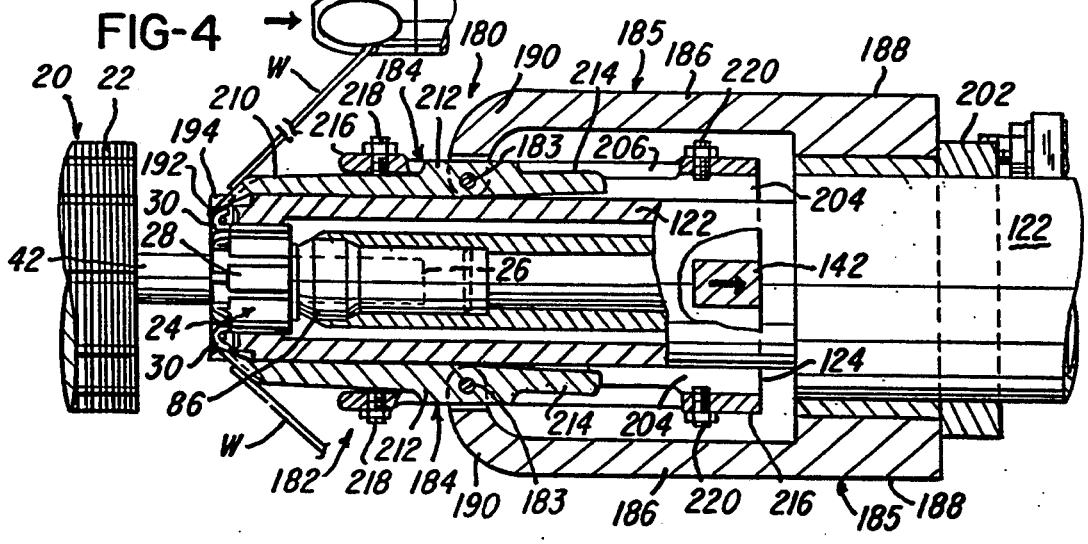
FIG. 4 is a cross sectional view similar to FIGS. 2 and 3, illustrating the step of severing the start wires, with the outer shield again retracted.

After the parts have reached the position illustrated in FIG. 3, the outer shield 124 is again retracted, as illustrated in FIG. 4, whereupon the wire trimming blades 184 are pivoted to position their forward ends into the blade-receiving notches 194 and in engagement with the forward surfaces of the aligned tangs 30 and to position their wire trimming edges 192 between the start tangs 30 and the armature core 22. This step is illustrated in FIG. 8 wherein the start wire is designated 250 and the start wire loop about the start tang 30 is designated 252. The wire clamps 150 are retracted in a direction away from the armature core 22 so that the wire segments, designated 254, between the wire clamps 150 and the tangs 30 at the 6:00 o'clock and the 12:00 o'clock positions are pulled toward the wire trimming edges 192 and severed. With proper longitudinal adjustment of the positions of the wire trimming assemblies 180 and 182, the length of the remnant ends 256 of wire extending from the tangs 30 is quite short, as is illustrated in FIG. 9. Because the wire trimming blades have such a low profile and lie against the start tangs 30, and because the wire grippers 150 move in a longitudinal direction away from the armature core 22, the coil leads are bent at a relatively sharp angle around the wire trimming edges 192. In consequence, the wires are severed cleanly and reliably against the wire trimming edges 192.

After the start wires are severed, the armature is rotated to move the start tang 30 at 12:00 o'clock to, or at least toward, the 9:00 o'clock position, and the start tang at 6:00 o'clock toward 3:00 o'clock, the effect of which is to draw the start wire loops 252 deeper into the tangs. The winding of the armature is thereafter carried out in conventional fashion, with the coil leads between successively wound coils connected to tangs exposed at the 3:00 o'clock and the 9:00 o'clock positions, as is well known in the art. During the winding operation, the short wire segments remaining with the wire grippers 150 are discarded.

After the last pair of coils is wound, the start tang 30 that began at the 3:00 o'clock position is located at the 9:00 o'clock position, whereas the start tang that was located at the 9:00 o'clock position is now at the 3:00 o'clock position. These tangs are now in position to have finish wires, designated 258 in FIGS. 10 and 11, hooked thereto, which is accomplished in known manner by a retraction of the outer shield 124, followed by reverse rotations of the fliers 70 and 76 by which the finish wires 258 are hooked around the start tangs 30. The outer shield 124 is again extended, which ensures that the finish wires 258 remain hooked to the start tangs 30, and the armature is again rotated to move the start tangs 30 from 3:00 o'clock to 12:00 o'clock and from 9:00 o'clock to 6:00 o'clock, respectively. The outer shield 124 is again retracted to position the wire trimming edges 192 between the start tangs 30 and the armature core 22, which is the condition of parts illustrated in FIG. 10. By then advancing the wire grippers 150 to engage and grip the wire segments 260 between the start tangs 30 and the fliers, and thereafter retracting the wire grippers 150 away from the armature core 22, the finish wires 258 are cleanly and reliably severed at the start tangs 30, with their severed ends 262 located immediately adjacent the sides of the start tangs 30, as illustrated in FIG. 11.

With reference to FIGS. 8 and 10, it will be observed that the portion, designated 192A, of the wire trimming edge 192 against which the start wire 250 is severed is offset with respect to the portion, designated 192B, against which the finish wire 258 is severed. With respect to the armature being wound, the offset between the two trimming edge portions 192A and 192B is circumferential, radial and longitudinal. A circumferential offset is dictated by the fact that the start wire 250 is severed adjacent one side of the start tang 30 and the finish wire 258 is severed adjacent the opposite side. The radial and the longitudinal offsets are preferred so that (a) the start wire trimming portion 192A is located to prevent the wire segment 254 leading to the wire clamp 150 from squeezing any part of the start wire loop 252, the start wire loop 252 being protected by the overlying part of the wire trimming blade 184, and (b) the finish wire trimming portion 192B is so located that the severed end 262 of the finish wire 258 is alongside the start tang 30 and does not project above it and so that space is provided along the tang 30 for the finish wire 258 to hook over the tang 30 above, i.e. radially outwardly of, the start wire loop 252.

A purpose of the step of rotating an armature through 90 degrees after the finish wires are hooked about start tangs is to locate the wire segment leading from the start tangs to the fliers in positions to be gripped by the wire grippers 150. Another purpose, of course, is to position the same wire segments in alignment with the wire trimming edge portions 192B in preparation for the wire trimming operations. An armature is rotated through 90 degrees after the start wires are looped around the tangs in order to align the wire segments between the start tangs and the fliers with the trimming edge portions 192A. There may be occasions in which the 90 degree rotation of an armature will not result in a proper alignment between both the start and the finish wires. In such event, the armature can be rotated through slightly different angles as required for proper alignment of the wires segments to be trimmed with the knife edges.

Figure 12:
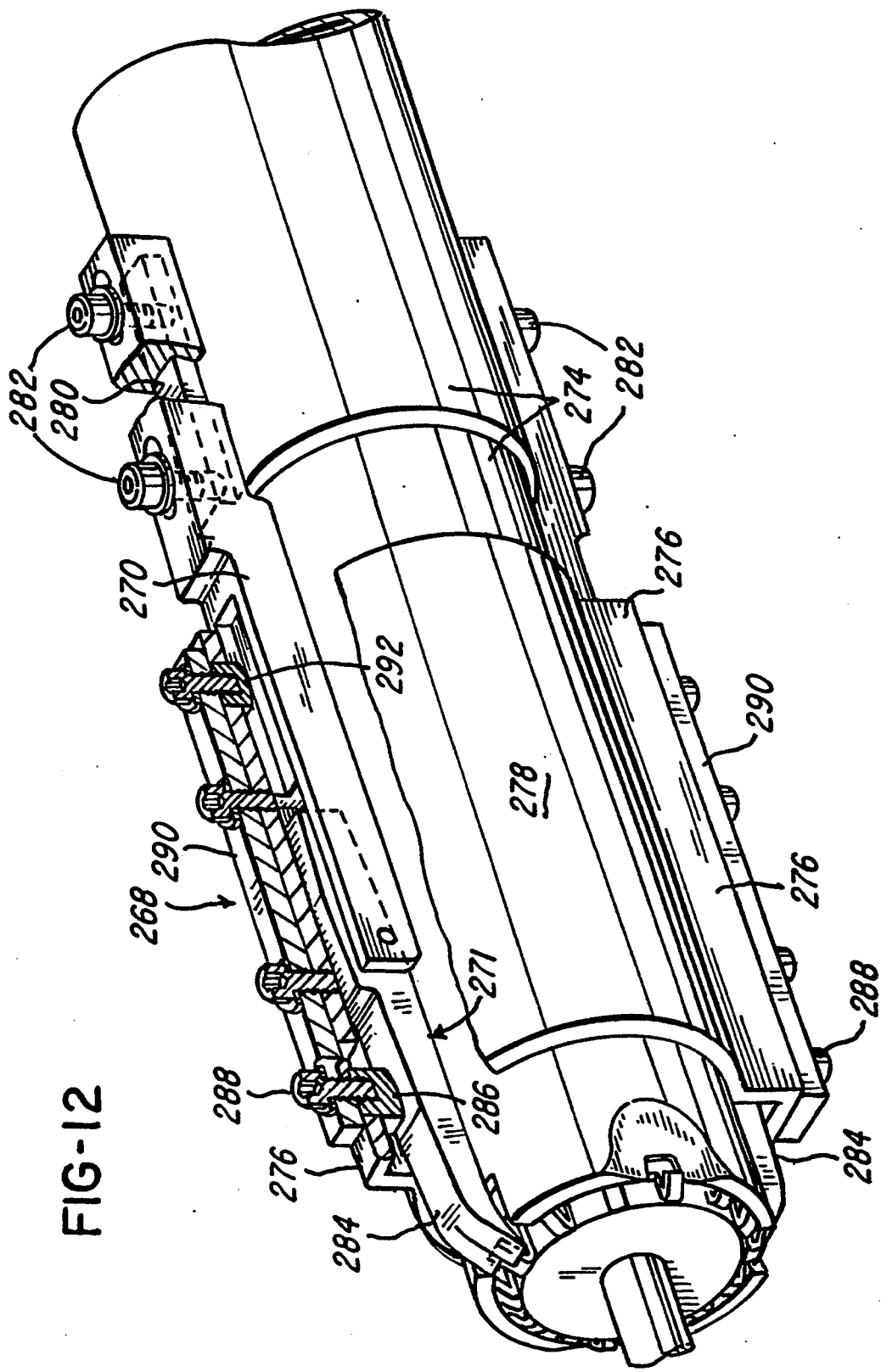
FIG. 12 is a simplified perspective view, with parts shown in cross section, of a portion of a second embodiment of an armature winding machine in accordance with this invention.

With reference to FIGS. 12 and 13, a second embodiment of an armature winding machine in accordance with this invention is illustrated that includes a wire trimming assembly, generally designated 268, that differs from the embodiment disclosed in FIGS. 1 through 11 primarily in that a support bracket 270 for a wire trimming blade 271 is provided in the second embodiment that has a low profile, with its clevis end located in an elongate, blade-receiving compartment 272 formed between an inner shield 274 and a hollow ridge 276 formed on an outer shield 278. Instead of the large clamp 200 of the first embodiment, the support bracket 270 of FIGS. 12 and 13 is slidably mounted for longitudinal movement along a key 280 on the inner shield 274 and is held in a longitudinally adjusted position by a pair of mounting screws 282. This particular mounting arrangement occupies less space and enables an easier adjustment and a quicker assembly and disassembly than the mounting arrangement of the first embodiment.

Further to enhance the adjustability of the position of the wire trimming blade 271, the sloping top or cam surface, designated 284, of its forwardmost section is engaged by a cam bearing member 286 mounted by means of a screw 288 to the underside of a mounting plate 290 affixed by screws 291 to the top or radially outermost surface of the outer shield ridge 276. The bearing mounting screw 288 is located in an elongate slot in the mounting plate 290 and the cam bearing member 286 is similarly located in an elongate slot in the outer shield 278. Accordingly, the longitudinal location of the cam bearing member 286 on the outer shield 278 is readily adjustable in order to adjust the angle by which the forward end of the wire trimming blade 271 is forced downwardly when the outer shield 278 is retracted. A second, rearward cam bearing member 292 is mounted by a screw 293 on the mounting plate 290 for camming the trimming blade 271 so that its forward end is moved radially outwardly when the outer shield 278 is extended in order to permit replacement of a wound armature by an unwound armature. Of course, a companion wire trimming assembly (not shown), which is essentially identical to the wire trimming assembly 268, is located at the 6:00 o'clock position. The function of the parts of the second embodiment is the same as the corresponding parts of the first embodiment, the same sequence of operations being performed to sever the start and finish wires.

A third embodiment illustrated in FIG. 14 is similar to the second embodiment of FIGS. 12 and 13 and utilizes an outer shield which may be identical to the outer shield 278 of FIGS. 12 an 13, and to which like parts are labelled by like reference numbers. The wire trimming blade, designated 300 of FIG. 14, instead of having a wire trimming edge with radially and longitudinally offset portions, as in both the first and second embodiments, has a straight trimming edge 302. In this third embodiment, to move the wire trimming edge 302 to different locations, as required for proper trimming of the start and finish wires, the wire trimming blade 300 is movable to longitudinally-spaced positions by operation of an air actuator 304 connected to its support bracket, designated 306. A change in the longitudinal position of the wire trimming blade 300 is accompanied by a change in the relative longitudinal positions of the blade 300 and its associated outer shield 278. A change in the longitudinal position of the blade 300 is accompanied by a change in the radial location of the wire trimming edge 302. If for example, the blade 300 is retracted by the air actuator 304, the leading end of the blade 300 will slide up the sloping forward surface of the start tang with which it is engaged. This movement of the trimming edge 302 is possible because retraction of the blade 300 causes a change in the relationship between the forwardmost cam bearing member 286 and the sloping upper cam surface 310 along the forward section of the trimming blade 300. When the blade 300 is extended forwardly, the forwardmost cam bearing member 286 sliding along the upper cam surface 310 will force the leading end of the blade 300 to move radially inwardly. Accordingly, it is seen that, by operation of the air actuator 304, the position of the wire trimming edge 302 can be both longitudinally and radially offset between the times when a start wire is severed and the times when a finish wire is severed.

Air actuator 304 preferably has a piston rod 312 connected to a connecting bracket 314 adjustably connected to the blade support bracket 306 by screws 318. In the embodiment of FIG. 14, an elongate key 320 on the inner shield, designated 274, provides a guide for controlling the longitudinal movement of the blade support bracket 316. As should be apparent, the actuator 304 is energized when appropriate to move the blade 300 forwardly, i.e. to the left in FIG. 14, in advance of the steps taken to sever a start wire and thereafter again actuated to move the blade 300 rearwardly in preparation for severing the associated finish wire. Again, a companion wire trimming assembly (not shown), which is essentially identical to the wire trimming assembly shown in FIG. 14, will be located at the 6:00 o'clock position.

Figure 15:
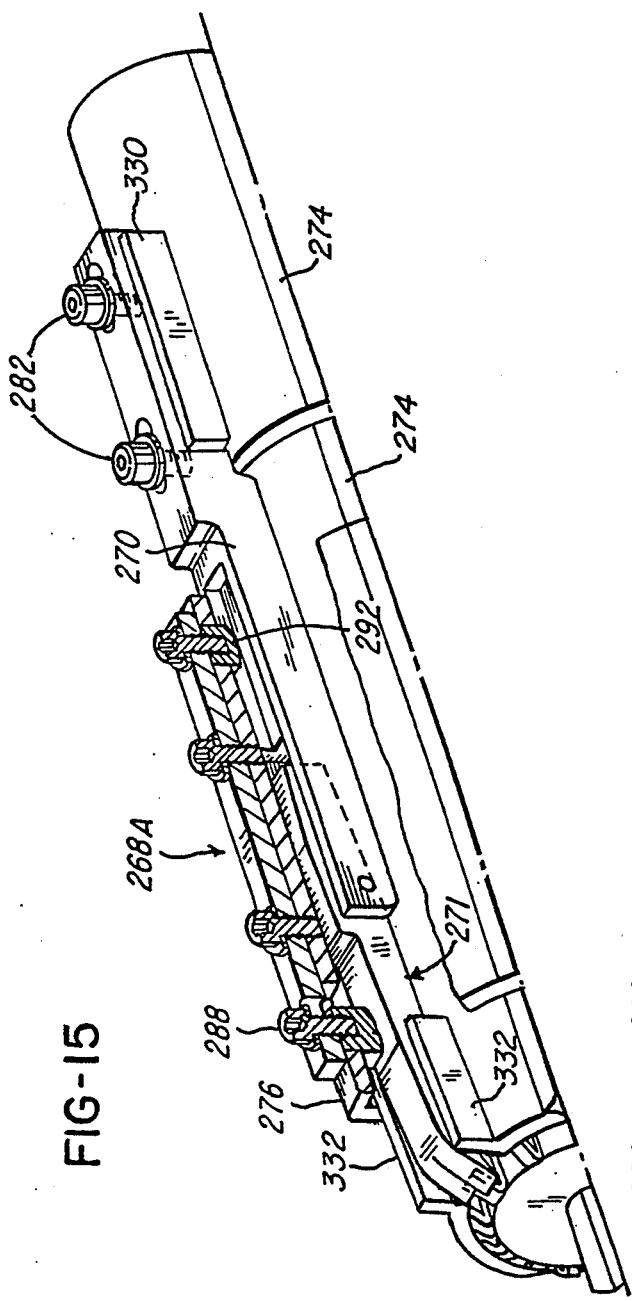
FIG. 15 is a fragmentary, simplified perspective view, with parts shown in cross section, of a portion of a fourth embodiment of an armature winding machine in accordance with this invention.
Figure 16:
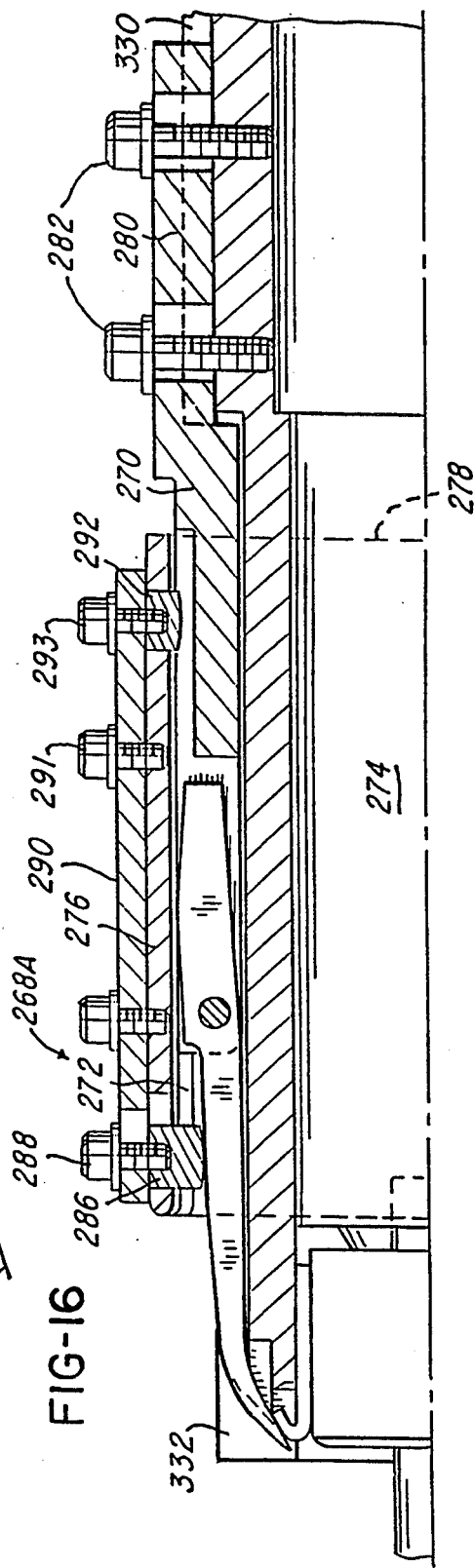
FIG. 16 is an enlarged, simplified, cross-sectional view of a portion of the machine of the embodiment illustrated in FIG. 15.

FIGS. 15 and 16 show a wire trimming assembly, generally designated 268A, which is a modification of the wire trimming assembly 268 of FIGS. 12 and 13, and parts in FIGS. 15 and 16 like parts in FIGS. 12 and 13 are given like reference numbers. In the embodiment of FIGS. 15 and 16, a first pair of mutually-parallel guide plates 330 project upwardly from the rearward end of the inner shield 274, between which the support bracket 270 is snugly confined in order to prevent lateral movement of the support bracket 270. The support bracket 270 may be moved longitudinally along the inner shield 274 between the guide plates 330 so that the need for the key 280 in the embodiment of FIGS. 12 and 13 is eliminated. As before, screws 282 are used to maintain the support bracket 270 in a longitudinally adjusted position. To prevent lateral movement of the trimming blade 271, a second pair of mutually-parallel guide plates 332 project upwardly from the forward end of the inner shield 274 and snugly confine the trimming blade 271 between them. The two pairs of guide plates 330 and 332 are preferably machined in one piece with the inner shield, but could be mounted thereon, as by welding. The provision of the two pairs of guide plates 330 and 332 has been found to enhance the accuracy, and uniformity, of the positions of the sharp edges of the trimming tool 271, as compared to the embodiment of FIGS. 12 and 13. As with the other embodiments of this invention, a companion wire trimming assembly (not shown), which is essentially identical to the wire trimming assembly 268A of FIGS. 15 and 16, is located at the 6:00 o'clock position.

Preferably, in every case the wire trimming blade will engage the surface of its associated start tang which confronts the armature core during the wire-severing operations. Such can be assured in the embodiments of the invention discussed above, provided that the forward camming surfaces of the wire trimming blades are properly contoured and the positions of the bearing members are properly adjusted.

Although in most cases it will be preferred that the severing of a start wire will be at a location which is both longitudinally and radially offset from the location at which the accompanying finish wire is trimmed, there may be cases in which only a radial or a longitudinal offset is desired or acceptable. As is apparent, such limited offsets can readily be obtained by appropriately shaping the wire trimming blades.

An armature at the winding station of an armature winding machine is rotated only when the outer shield is extended, and when the wire trimming edges are thereby spaced from the tangs. Accordingly, the wire trimming blades of this invention will not interfere with any of the armature winding operations.

The foregoing description assumes that an armature is being wound that has an even number of slots. When winding such armatures, both fliers are rotated to wind coils during each winding cycle and the tangs exposed by the inner shield notches 126 are diametrically opposed from one another. Some armatures have an odd number of slots. When winding an "odd-slot" armature, there is at least one winding cycle, such as the first cycle, during which only one flier is rotated to wind a coil. In such event, it will be apparent to those skilled in the art that the start wire associated with the flier that winds the odd coil or coils will be connected and severed before the start wire associated with the other flier will be connected. Also, when winding odd-slot armatures, the inner shield notches are not diametrically opposed and it will be necessary to complete the severing of the finish wires in two successive sequences so that the start tang for one finish wire is brought to its finishing 12:00 o'clock or 6:00 o'clock position for trimming before the other start tang is moved to its finishing position.

Although the presently preferred embodiment of this invention has been described, it will be understood that within the purview of the invention various changes may be made within the scope of the following claims.

We claim:

1. In an armature winding machine for winding an armature having an armature shaft, a core having coil-receiving slots mounted on said shaft, and a commutator mounted on said shaft, said commutator having coil lead-receiving tangs, said armature winding machine having a winding station, means for holding an armature in said winding station, at least one wire guiding flier for winding coils of wire in said coil-receiving slots, a commutator shield assembly comprising an inner shield having at least one notch for exposing a commutator tang to enable wire leading from said flier to be hooked around said exposed tang, and an outer shield movable between a first, extended position in which it covers said notch and a second, retracted position wherein it uncovers said notch, wire clamp means actuated to grip a stretch of wire extending from said flier at the end of the winding of one armature in said winding station until the commencement of the winding of the next armature in said winding station, and drive means for moving said wire clamp means, the improvement comprising:

a wire trimming blade having a sharp edge, a blade mounting bracket, means for pivotally mounting said wire trimming blade on said mounting bracket in a position wherein said wire trimming blade is closely adjacent the outer periphery of said inner shield and substantially parallel to the longitudinal axis of an armature in said winding station for rocking movement about a pivot axis extending transversely through said blade and intermediate its ends, means for pivoting said blade about said pivot axis to move said blade from a first position in which said sharp edge is located closely adjacent a tang and radially nearer the armature shaft than the outer edge of said last mentioned tang when said outer shield is retracted and located sufficiently remote from said tang when said outer shield is extended that it would not interfere with the removal of said armature from said winding station, and means on said inner shield for preventing lateral movement of said wire trimming blade.

2. The apparatus of claim 1 wherein said last mentioned means includes a pair of plates mounted on said inner shield between which the wire trimming blade is confined.

3. The apparatus of claim 1 further comprising means on said inner shield for preventing lateral movement of said support bracket.

4. The apparatus of claim 3 wherein said last mentioned means includes a pair of plates mounted on said inner shield between which said support bracket is confined.

5. The apparatus of claim 1 wherein said wire trimming blade has two sharp edges which are radially and longitudinally offset from one another for severing, respectively, the start wires and the finish wires.

6. In an armature winding machine for winding an armature having an armature shaft, a core having coil-receiving slots mounted on said shaft, and a commutator mounted on said shaft, said commutator having coil lead-receiving tangs, said armature winding machine having a winding station, means for holding an armature in said winding station, at least one wire guiding flier for winding coils of wire in said coil-receiving slots, a commutator shield assembly comprising an inner shield having at least one notch for exposing a commutator tang to enable wire leading from said flier to be hooked around said exposed tang, and an outer shield movable between a first, extended position in which it covers said notch and a second, retracted position wherein it uncovers said notch, wire clamp means actuated to grip a stretch of wire extending from said flier at the end of the winding of one armature in said winding station until the commencement of the winding of the next armature in said winding station, and drive means for moving said wire clamp means, the improvement comprising:

a wire trimming blade having two sharp edges which are radially and longitudinally offset from one another for severing, respectively, the start wires and the finish wires, a blade mounting bracket, means for pivotally mounting said wire trimming blade on said mounting bracket in a position wherein said wire trimming blade is closely adjacent the outer periphery of said inner shield and substantially parallel to the longitudinal axis of an armature in said winding station for rocking movement about a pivot axis extending transversely through said blade and intermediate its ends, and means for pivoting said blade about said pivot axis to move said blade from a first position in which said sharp edges are located closely adjacent a tang and radially nearer the armature shaft than the outer edge of said last mentioned tang when said outer shield is retracted to a second position in which said sharp edges are located sufficiently remote from said tang when said outer shield is extended that it would not interfere with the removal of said armature from said winding station.

7. In a method of winding armatures by a double flier armature winding machine and automatically severing start and finish lead wires adjacent each of a pair of commutator start tangs utilizing a wire trimming member having edge surfaces around which the start and finish wires are coursed and against which the start and finish wires are pulled in order to sever them, the improvement comprising the steps of:

orienting an armature having a start wire looped around a start tang in a position wherein said tang is positioned in alignment with said wire trimming member;

positioning a sharp edge portion of said wire trimming member at a first location between the armature core and the face of said start tang confronting the core;

severing the wire segment leading from said wire gripper to said start tang by moving said wire gripper at a direction to cause said wire segment to be pulled against said sharp edge;

winding coils on said armature core and connecting coil leads between said coils to tangs on said commutator;

after the last pair of coils are wound, hooking a finish wire about a start tang;

orienting said armature with said finish wire hooked about said last mentioned start tang by rotating said armature to position said last mentioned tang in alignment with said wire trimming member;

positioning a portion of said sharp edge of said trimming member between said core and the face of said last mentioned tang at a second location which is radially further from the armature shaft than said first location; and severing said wire at said second location by moving said wire gripper away from said armature core.

8. The method of claim 7 wherein said second location is longitudinally further from said core then said first location.

9. The method of claim 7 further comprising the step of mounting said blade for pivotal movement on an axis extending transversely through said blade and wherein portions of said sharp edge are laterally spaced apart from one another and offset from one another both radially and longitudinally with respect to an armature being wound.

10. The method of claim 9 wherein said edge portions are positioned in said first location and said second location, respectively, by moving said blade so that said edge portions are displaced both radially and longitudinally with respect to an armature being wound.

11. In a method of winding armatures by a double flier armature winding machine and automatically severing start and finish lead wires adjacent each of a pair of commutator start tangs utilizing a wire trimming member having edge surfaces around which the start and finish wires are coursed and against which the start and finish wires are pulled in order to sever them, the improvement comprising the steps of:

orienting an armature having a start wire looped around a start tang in a position wherein said tang is positioned in alignment with said wire trimming member;

positioning a sharp edge portion of said wire trimming member at a first location between the armature core and the face of said start tang confronting the core;

severing the wire segment leading from said wire gripper to said start tang by moving said wire gripper at a direction to cause said wire segment to be pulled against said sharp edge;

winding coils on said armature core and connecting coil leads between said coils to tangs on said commutator;

after the last pair of coils are wound, hooking a finish wire about a start tang;

orienting said armature with said finish wire hooked about said last mentioned start tang by rotating said armature to position said last mentioned tang in alignment with said wire trimming member;

positioning a portion of said sharp edge of said trimming member between said core and the face of said last mentioned tang at a second location which is longitudinally further from the armature shaft than said first location; and severing said wire at said second location by moving said wire gripper away from said armature core.

12. The method of claim 11 further comprising the step of mounting said blade for pivotal movement on an axis extending transversely through said blade and wherein portions of said sharp edge are laterally spaced apart from one another and offset from one another both radially and longitudinally with respect to an armature being wound.

13. The method of claim 11 wherein said edge portions are positioned in said first location and said second location, respectively, by moving said blade so that said edge portions are displaced with respect to an armature being wound.

* * * * *